US008712897B2

(12) United States Patent
Lee et al.

(10) Patent No.: US 8,712,897 B2
(45) Date of Patent: Apr. 29, 2014

(54) STOCK ANALYSIS METHOD, COMPUTER PROGRAM PRODUCT, AND COMPUTER-READABLE RECORDING MEDIUM

(76) Inventors: Hwey-Chyi Lee, Tainan (TW); Sheng-Shyr Cheng, Tainan (TW)

( * ) Notice: Subject to any disclaimer, the term of this patent is extended or adjusted under 35 U.S.C. 154(b) by 0 days.

(21) Appl. No.: 13/484,552

(22) Filed: May 31, 2012

(65) Prior Publication Data

US 2013/0325747 A1 Dec. 5, 2013

(51) Int. Cl.
*G06Q 40/00* (2012.01)
(52) U.S. Cl.
USPC ............................................ 705/36 R
(58) Field of Classification Search
CPC .............................. G06Q 40/06; G06Q 40/04
USPC ..................................................... 705/35–45
See application file for complete search history.

(56) References Cited

U.S. PATENT DOCUMENTS

| | | | | |
|---|---|---|---|---|
| 6,907,403 | B1* | 6/2005 | Klein et al. | 705/36 R |
| 7,421,405 | B2* | 9/2008 | Little et al. | 705/36 R |
| 7,580,876 | B1* | 8/2009 | Phillips et al. | 705/36 R |
| 7,702,556 | B2* | 4/2010 | Charnley, Jr. | 705/36 R |
| 7,882,001 | B2* | 2/2011 | Nahum | 705/35 |
| 7,949,590 | B2* | 5/2011 | Strongin, II | 705/36 R |
| 8,082,201 | B2* | 12/2011 | Nahum | 705/35 |
| 8,249,970 | B1* | 8/2012 | Phillips et al. | 705/36 R |
| 2003/0074295 | A1* | 4/2003 | Little et al. | 705/36 |
| 2004/0083151 | A1* | 4/2004 | Craig et al. | 705/36 |
| 2004/0143533 | A1* | 7/2004 | Preist et al. | 705/36 |
| 2005/0049952 | A1* | 3/2005 | Carter | 705/36 |
| 2007/0203720 | A1* | 8/2007 | Singh et al. | 705/1 |
| 2007/0299785 | A1* | 12/2007 | Tullberg | 705/36 R |
| 2008/0077539 | A1* | 3/2008 | Drain | 705/36 R |
| 2008/0249957 | A1* | 10/2008 | Masuyama et al. | 705/36 R |
| 2009/0006226 | A1* | 1/2009 | Crowder | 705/30 |
| 2009/0326973 | A1* | 12/2009 | Hurewitz | 705/1 |
| 2011/0087620 | A1* | 4/2011 | Nahum | 705/36 R |
| 2013/0046710 | A1* | 2/2013 | Kartoun et al. | 705/36 R |

OTHER PUBLICATIONS

Anonymous, "Searching the Aerospace & Defence Sector for the Best", Shareowner, May 2007; 20, 5; Proquest Central, pp. 1-6.*
Raman, Vardharaj; Fabozzi, Frank J., "Sector, Style, Region: Explaining Stock Allocation Performance", Financial Analysts Journal 63.3, May/Jun. 2007, pp. 59-70, 2.*
Taing, Siv; Worthington, Andrew, "Return Relationships Among European Equity Sectors: A Comparative Analysis Across Selected Sectors in Small and Large Economies", Journal of Applied Economics 8.2, (Nov. 2005), pp. 371-388.*
Knepp, Tim, "Richer Diversification: Helping your clients better understand industry classifications so they appreciate your expertise", on Wall Street, Mar. 1, 2008, p. 1.*

* cited by examiner

*Primary Examiner* — Mohammad Z Shaikh
(74) *Attorney, Agent, or Firm* — Muncy, Geissler, Olds & Lowe, P.C.

(57) ABSTRACT

In a stock analysis method for performing an analysis on stocks to select target ones to be bought/sold from the stocks, each stock is grouped into a corresponding group based on stock return data thereof, market return data and industry return data of each corresponding classified industry. Clustering data for each stock corresponding to each time interval and associated with the groups is obtained based a clustering mode. Analysis data for each stock corresponding to a coming time interval is estimated based on the corresponding clustering data. Any ones of the stocks, whose analysis data matches predetermined selection criteria, are determined as the target stocks.

14 Claims, 9 Drawing Sheets

| company code:1101 | | | | | | | | | | |
|---|---|---|---|---|---|---|---|---|---|---|
| date | group | group permutation pattern | rising average return | falling average return | M | rising probability | falling probability | standard deviation (%) | expected return (%) | expected return per unit of risk(%) | risk per unit of return(%) |
| 3/1/2010 | G4 | G1-G1-G8-G5-G4 | 2.588 | -2.372 | 1783 | 0.402 | 0.464 | 2.922 | -0.061 | -0.021 | -47.619 |
| 2/26/2010 | G5 | G6-G1-G1-G8-G5 | 2.483 | -2.025 | 618 | 0.333 | 0.443 | 2.504 | -0.070 | -0.028 | -35.714 |
| 2/25/2010 | G8 | G1-G6-G1-G1-G8 | 2.413 | -2.245 | 961 | 0.331 | 0.407 | 2.595 | -0.115 | -0.044 | -22.727 |
| 2/24/2010 | G1 | G4-G1-G6-G1-G1 | 2.863 | -2.044 | 556 | 0.372 | 0.412 | 2.769 | 0.224 | 0.081 | 12.346 |
| 2/23/2010 | G1 | G4-G4-G1-G6-G1 | 2.503 | -2.185 | 502 | 0.367 | 0.444 | 2.671 | -0.053 | -0.020 | -50.000 |
| 2/22/2010 | G6 | G6-G4-G4-G1-G6 | 1.850 | -1.945 | 197 | 0.442 | 0.401 | 2.318 | 0.037 | 0.016 | 62.500 |
| 2/10/2010 | G1 | G6-G6-G4-G4-G1 | 2.065 | -1.922 | 261 | 0.364 | 0.487 | 2.447 | -0.184 | -0.075 | -13.333 |
| 2/9/2010 | G4 | G5-G6-G6-G4-G4 | 1.949 | -2.088 | 209 | 0.440 | 0.368 | 2.403 | 0.089 | 0.037 | 27.027 |
| 2/8/2010 | G4 | G6-G5-G6-G6-G4 | 1.943 | -1.796 | 193 | 0.280 | 0.295 | 1.834 | 0.013 | 0.007 | 142.857 |
| 2/6/2010 | G6 | G1-G6-G5-G6-G6 | 2.162 | -1.875 | 234 | 0.265 | 0.286 | 1.984 | 0.036 | 0.018 | 55.556 |

FIG. 5 target stocks on 3/1/2010

| target ranking | company code | S(G1) | group | rising average return | falling average return | M | rising probability | falling probability | standard deviation (%) | expected return (%) | expected return per unit of risk(%) |
|---|---|---|---|---|---|---|---|---|---|---|---|
| 1 | 3518 | 0 | G5 | 3.579 | -1.777 | 41 | 0.683 | 0.293 | 3.063 | 1.924 | 0.628 |
| 2 | 3481 | 0 | G5 | 3.342 | -2.605 | 90 | 0.611 | 0.356 | 3.482 | 1.116 | 0.321 |
| 3 | 2448 | 0 | G5 | 3.358 | -2.480 | 160 | 0.531 | 0.394 | 3.616 | 0.927 | 0.256 |
| 4 | 6147 | 0 | G5 | 3.283 | -2.473 | 118 | 0.551 | 0.390 | 3.428 | 0.844 | 0.246 |
| 5 | 6257 | 0 | G5 | 2.454 | -1.732 | 117 | 0.538 | 0.402 | 2.610 | 0.626 | 0.240 |
| 6 | 5347 | 0 | G5 | 3.492 | -2.502 | 239 | 0.502 | 0.402 | 3.529 | 0.748 | 0.212 |
| 7 | 3034 | 0 | G5 | 2.803 | -2.698 | 174 | 0.575 | 0.385 | 3.268 | 0.572 | 0.175 |
| 8 | 8131 | 1 | G5 | 2.440 | -2.353 | 43 | 0.558 | 0.419 | 3.131 | 0.377 | 0.120 |
| 9 | 2409 | 0 | G5 | 2.756 | -2.473 | 248 | 0.508 | 0.415 | 3.159 | 0.374 | 0.118 |
| 10 | 2458 | 0 | G5 | 2.871 | -2.560 | 146 | 0.507 | 0.438 | 3.283 | 0.333 | 0.101 |

| target ranking | company code | group | group permutation pattern | rising average return | falling average return | M | rising probability | falling probability | standard deviation (%) | expected return (%) | expected return per unit of risk(%) |
|---|---|---|---|---|---|---|---|---|---|---|---|
| 1 | 6265 | G5 | G4-G1-G4-G5-G5 | 2.885 | -2.369 | 1239 | 0.374 | 0.472 | 3.046 | -0.041 | -74.823 |
| 2 | 2524 | G4 | G4-G5-G4-G1-G4 | 2.342 | -2.243 | 1442 | 0.420 | 0.457 | 2.745 | -0.043 | -64.190 |
| 3 | 2323 | G8 | G1-G1-G1-G8-G8 | 2.764 | -2.927 | 5866 | 0.438 | 0.447 | 3.332 | -0.098 | -34.095 |
| 4 | 4903 | G8 | G1-G1-G1-G8-G8 | 2.764 | -2.927 | 5866 | 0.438 | 0.447 | 3.332 | -0.098 | -34.095 |
| 5 | 8080 | G8 | G1-G1-G1-G8-G8 | 2.764 | -2.927 | 5866 | 0.438 | 0.447 | 3.332 | -0.098 | -34.095 |
| 6 | 4134 | G8 | G8-G1-G1-G1-G8 | 2.600 | -2.652 | 4046 | 0.417 | 0.446 | 3.065 | -0.098 | -31.268 |
| 7 | 2820 | G5 | G6-G3-G5-G1-G5 | 2.530 | -2.114 | 118 | 0.364 | 0.483 | 2.668 | -0.099 | -26.880 |
| 8 | 6156 | G8 | G4-G1-G1-G6-G8 | 2.030 | -2.159 | 771 | 0.399 | 0.422 | 2.489 | -0.099 | -25.125 |
| 9 | 5515 | G4 | G4-G8-G1-G1-G4 | 2.387 | -2.313 | 2245 | 0.405 | 0.470 | 2.806 | -0.120 | -23.345 |
| 10 | 1584 | G4 | G3-G3-G1-G1-G4 | 2.474 | -2.275 | 402 | 0.368 | 0.453 | 2.750 | -0.119 | -23.123 | target stocks on 3/1/2010

FIG. 6

| variable | regression coefficient | t value |
|---|---|---|
| offset | -1.41659 | -65.94 |
| weighted stock price | 0.98105 | 155.6 |
| index daily return(%) | 0.00124 | 0.1 |
| S(G1) | | |
| G1 dummy (=1 if group=G1, 0 otherwise) | 3.30222 | 100.34 |
| G3 dummy (=1 if group=G3, 0 otherwise) | 2.10927 | 65.66 |
| G4 dummy (=1 if group=G4, 0 otherwise) | 0.66734 | 20.56 |
| G5 dummy (=1 if group=G5, 0 otherwise) | 2.2071 | 68.19 |
| G6 dummy (=1 if group=G6, 0 otherwise) | 0.79599 | 23.82 |
| no. of historical trading days | 10834 | |
| adjusted R-squared value | 0.7749 | |
| F value | 5328.54 | |
| predictive error model | | |
| 1. RMS error | 0.01011 | |
| 2. RMS percent error | 0.9467 | |
| 3. mean simulation error | close to 0 | |
| 4. mean percent error | 0.011836 | |
| 5. Theil inequality coefficient (U value) | 0.25208 | |
| model predictive value (%) | 1.12204 | |

FIG. 8a

| variable | regression coefficient | t value |
|---|---|---|
| offset | -1.41555 | -72.26 |
| weighted stock price | 0.9806 | 155.61 |
| index daily return(%) | 0.43748 | 4.03 |
| group permutation pattern: G1-G1-G1 | | |
| G1 dummy (=1 if group=G1, 0 otherwise) | 3.28319 | 107.52 |
| G3 dummy (=1 if group=G3, 0 otherwise) | 2.10934 | 65.72 |
| G4 dummy (=1 if group=G4, 0 otherwise) | 0.66705 | 20.56 |
| G5 dummy (=1 if group=G5, 0 otherwise) | 2.20714 | 68.23 |
| G6 dummy (=1 if group=G6, 0 otherwise) | 0.79621 | 23.84 |
| no. of historical trading days | 10834 | |
| adjusted R-squared value | 0.7752 | |
| F value | 5337.11 | |
| predictive error model | | |
| 1. RMS error | 0.010104 | |
| 2. RMS percent error | 0.94586 | |
| 3. mean simulation error | close to 0 | |
| 4. mean percent error | 0.012115 | |
| 5. Theil inequality coefficient (U value) | 0.25186 | |
| model predictive value (%) | 1.11944 | |

FIG. 8b

STOCK ANALYSIS METHOD, COMPUTER PROGRAM PRODUCT, AND COMPUTER-READABLE RECORDING MEDIUM

BACKGROUND OF THE INVENTION

1. Field of the Invention

The invention relates to stock analysis, and more particularly to a stock analysis method, a computer program, product, and computer-readable recording medium.

2. Description of the Related Art

The fundamental idea behind a stock market is profit: buy low and sell high. The reason to form a portfolio is to reduce investment risk by diversification. Note that variation about the long term return is the risk, which includes price changes upward as well as downward. The efficiently learning market movements and the capital asset pricing model hold that prices eventually reflect the fact that a high risk demands a high return.

Traditionally, techniques and methods for analysis stock by comparing information of each company stock with that of a corresponding classified industry or a market are gradually become more limited in efficacy because performance of a company stock belonging to a superior classified industry, which can be defined as required, may be worse than that of the market or because a company stock with performance superior to that of the market may belong to an inferior classified industry. Thus, a high return cannot be ensured.

Therefore, improvements may be made to the conventional techniques and methods.

SUMMARY OF THE INVENTION

Therefore, an object of the present invention is to provide a stock analysis method for performing an analysis on a plurality of stocks to select target ones to be bought/sold from the stocks that can overcome the aforesaid drawbacks of the prior art.

According to one aspect of the present invention, there is provided a stock analysis method for performing an analysis on a plurality of stocks to select target ones to be bought/sold from the stocks. The company of each of the stocks belongs to a corresponding classified industry. The stock analysis method of the present invention comprises the steps of:

a) calculating, based on historical stock price information within a historical trading period including a current trading period, stock return data of each of the stocks, market return data, and classified industry return data of each of the corresponding classified industries, the historical trading period consisting of a number (N) of consecutive time intervals;

b) according to the stock return data, the market return data and the classified industry return data obtained in step a), determining whether a stock return of each of the stocks in each of the N time intervals is greater than a classified industry return of the corresponding classified industry in a corresponding one of the N time intervals, whether the stock return of each of the stocks in the corresponding one of the N time intervals is greater than a market return in the corresponding one of the N time intervals, and whether the classified industry return of the corresponding one of the classified industries in the corresponding one of the N time intervals is greater than the market return in the corresponding one of the N time intervals;

c) based on results determined in step b), grouping the stocks so that each of the stocks in each of the N time intervals is grouped into a corresponding one of a number (G) of different groups;

d) obtaining clustering data of each of the stocks corresponding to each of the N time intervals and associated with the groups based on a specific one of the groups using a clustering mode;

e) estimating analysis data of each of the stocks in a coming time interval based on at least the clustering data obtained in step d); and f) determining any ones of the stocks, whose analysis data estimated in step e) matches predetermined selection criteria, as the target ones of the stocks.

According to another aspect of the present invention, there is provided a computer program product stored on a computer readable recording medium. The computer program product of the present invention comprises program instructions for causing a computer to perform consecutive steps of the aforesaid stock analysis method of this invention.

According to yet another aspect of the present invention, there is provided a computer-readable recording medium that records a program for causing a computer to perform consecutive steps of the aforesaid stock analysis method of this invention.

BRIEF DESCRIPTION OF THE DRAWINGS

Other features and advantages of the present invention will become apparent in the following detailed description of the preferred embodiments with reference to the accompanying drawings, of which:

FIG. 4 shows another exemplary analysis result of a stock displayed on a client computer, the analysis result being obtained through the first preferred embodiment using a permutation clustering mode;

FIG. 5 shows an exemplary sorting result of target stocks displayed on a client computer, the sorting result being obtained through the first preferred embodiment using the combination clustering mode;

FIG. 6 shows another exemplary sorting result of target stocks displayed on a client computer, the sorting result being obtained through the first preferred embodiment using the permutation clustering mode;

FIGS. 8a and 8b show exemplary regression results predicted by the second preferred embodiment based on clustering data of a stock corresponding to combination and permutation clustering modes using a multivariate regression model, respectively.

DETAILED DESCRIPTION OF THE PREFERRED EMBODIMENTS

Figure 1:
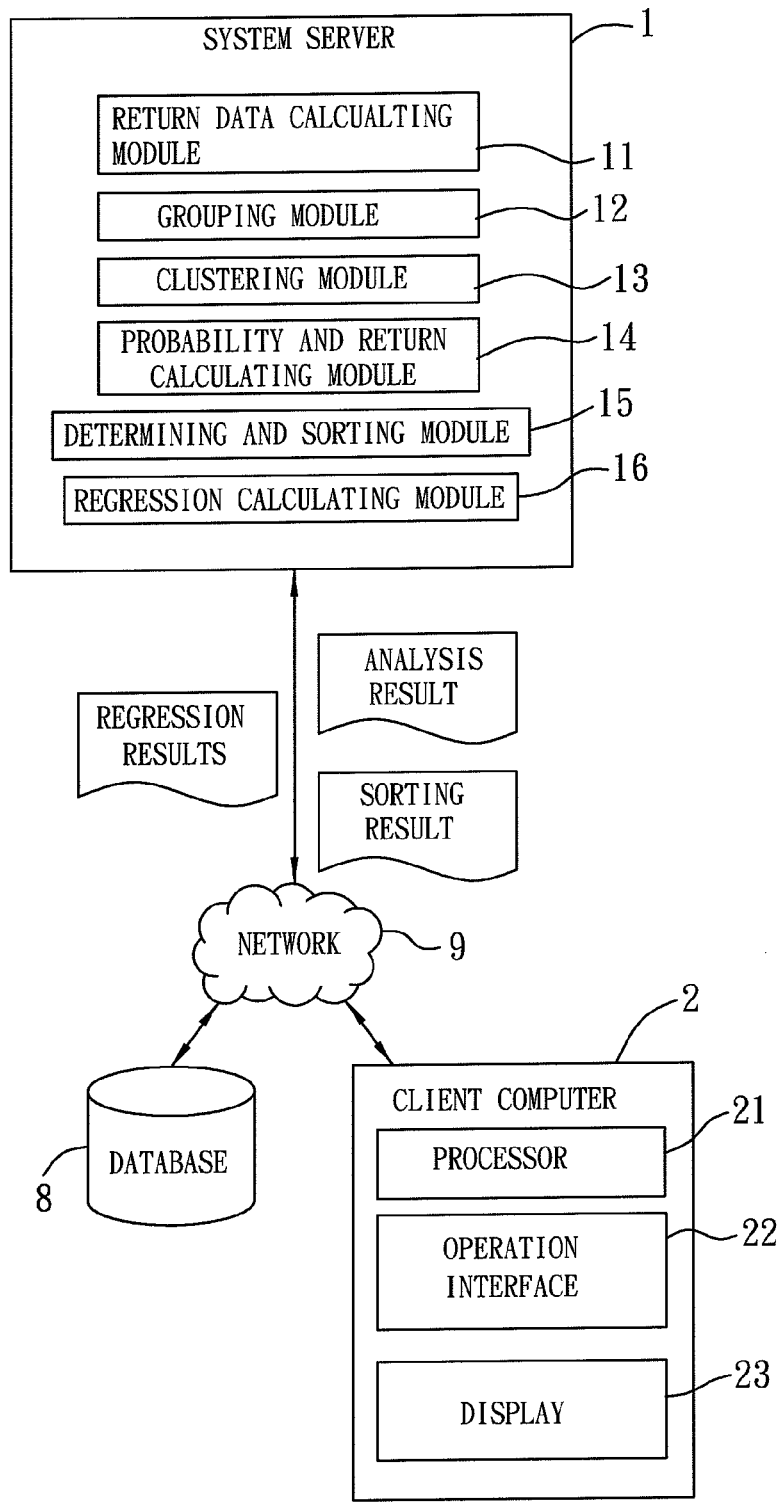
FIG. 1 shows the hardware architecture of a stock analysis system that implements a stock analysis method of the present invention.

Before the present invention is described in greater detail, it should be noted that like elements are denoted by the same reference numerals throughout the disclosure.

Referring to FIG. 1, the hardware architecture of a stock analysis system for implementing a stock analysis method of the present invention is shown to include a system server 1, a client computer 2, and a database 8 for storing stock price information of all stocks in a stock market. The system server 1 interconnects the database 8 and the client computer 2 through a network 9, such as internet network.

The client computer 2 includes a processor 21, an operation interface 22, and a display 23. The client computer 2 is operable to select a plurality of stocks as a stock portfolio to be analyzed through the operation interface 22. The company of each of the stocks selected by a client belongs to a corresponding classified industry, which is provided by Taiwan Stock Exchange and the OTC in this embodiment, but is not limited to this.

The system server 1 includes a return data calculating module 11, a grouping module 12, a clustering module 13, a probability and return calculating module 14, a determining and sorting module 15, and a regression calculating module 16.

Figure 2:
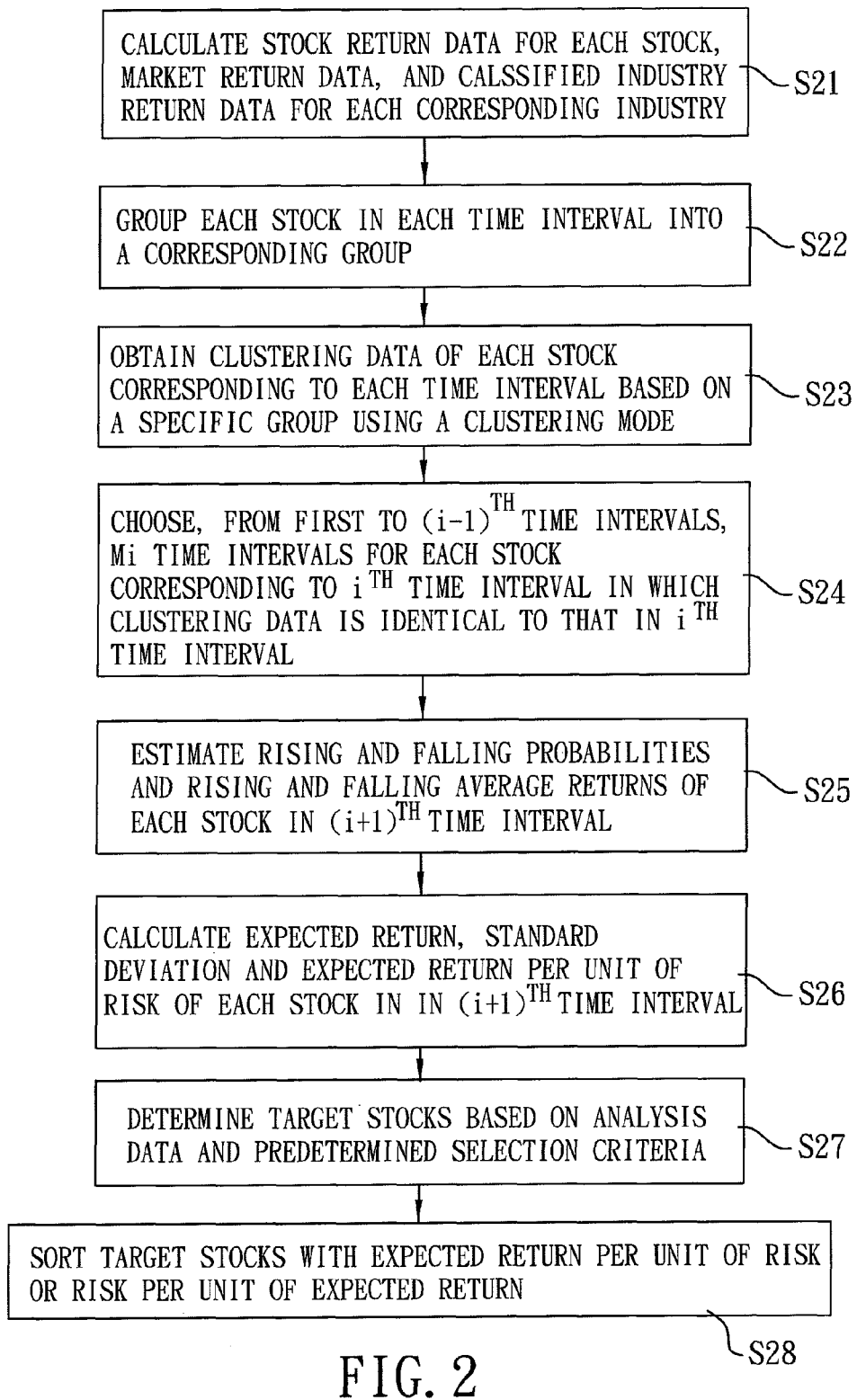
FIG. 2 is a flowchart to illustrate a first preferred embodiment of a stock analysis method according to the present invention.

FIG. 2 is a flowchart to illustrate a first preferred embodiment of a stock analysis method according to the present invention. The stock analysis method of the first preferred embodiment is used for performing an analysis on the stocks selected by the client computer 2 to select target ones to be bought/sold from the stocks.

In step S21, the return data calculating module 11 is configured to calculate stock return data of each stock, market return data, and classified industry return of each corresponding classified industry based on historical stock price information within a historical trading period including a current trading period from the database 8. The historical trading period consists of a number (N) of consecutive time intervals. In this embodiment, each of the current trading period and the time interval is equal to one trading day but is not limited to this. For example, if the historical trading period is a period from Jan. 1, 1971 to Mar. 1, 2010, the historical trading period consists of N(=10834) trading days, the day dated on Mar. 1, 2010 is regarded as a current trading day, and the date dated on Mar. 2, 2010 is regarded as a coming trading day. In other embodiments, the time interval can be equal to one-hour or five-minute period.

In step S22, the grouping module 12 is configured to determine, according to the stock return data, the market return data and the classified industry return data calculated in step S21, whether a stock return of each stock in each of the N time intervals is greater than a classified industry return of the corresponding classified industry return data in a corresponding one of the N time intervals, whether the stock return of each stock in the corresponding one of the N time intervals is greater than a market return in the corresponding one of the N time intervals, and whether the classified industry return of the corresponding one of the classified industries in the corresponding one of the N time intervals is greater than the market return in the corresponding one of the N time intervals. Then, the grouping module 12 is configured to group, based on results made thereby, the stocks so that each stock in each of the N time intervals is grouped into a corresponding one of a number (G) of different groups. In this embodiment, G=8, and first to eighth groups are respectively indicated by G1, G2, . . . , G8. The first to eighth groups (G1, G2, . . . , G8) are defined as the following Table 1:

TABLE 1

|  | industry return > market return | stock return > industry return | stock return > market return |
| --- | --- | --- | --- |
| G1 | YES | YES | YES |
| G2 | YES | YES | NO |
| G3 | YES | NO | YES |
| G4 | YES | NO | NO |
| G5 | NO | YES | YES |
| G6 | NO | YES | NO |
| G7 | NO | NO | YES |
| G8 | NO | NO | NO | wherein any one of the stocks grouped into the first group (G1) may be regarded as a strong stock, whereas any one of the stocks grouped into the eighth group (G8) may be regarded as a weak stock.

In step S23, the clustering module 13 is configured to obtain clustering data of each stock corresponding to each of the N time intervals and associated with the groups (G1, G2, . . . , G8) based on a specific one of the groups (G1, G2, . . . , G8) using a clustering mode. In this embodiment, the clustering mode is one of a combination clustering mode and a permutation clustering mode. When the clustering module 13 uses the combination clustering mode, the clustering data of each stock corresponding to an $i^{th}$ one of the N time intervals includes the corresponding one of the groups (G1, G2, . . . , G8) in the $i^{th}$ one of the N time intervals, and a number ($S_i$) of the time intervals in a reference period from $[i-(Q-1)]^{th}$ to $i^{th}$ ones of the N time intervals, where $1 \leq i \leq N$ and $2 \leq Q < i$, wherein a corresponding stock is grouped into said specific one of the groups (G1, G2, . . . , G8) in the number ($S_i$) of the time intervals. When the clustering module 13 uses the permutation clustering mode, the clustering data of each stock corresponding to the $i^{th}$ one of the N time intervals includes the corresponding group in the $i^{th}$ one of the N time intervals, and group permutation pattern consisting of the corresponding ones of the groups that correspond respectively to $[i-(Q-1)]^{th}$ to $i^{th}$ ones of the N time intervals. According the above example, if Q=5, the reference period is a five-trading day period.

In step S24, the clustering module 13 is configured to choose, from a period from first to $(i-1)^{th}$ ones of the N time intervals, a number ($M_i$) of the time intervals for each of the stocks corresponding to the $i^{th}$ one of the N time intervals, wherein the clustering data of each of the stocks in each of the number ($M_i$) of the time intervals is identical to that in the $i^{th}$ one of the N time intervals.

In step S25, the probability and return calculating module 14 is configured to choose, from a period from first to $i^{th}$ ones of the N time intervals, a number ($R_i$) of the time intervals for each stock corresponding to the $i^{th}$ one of the N time intervals, wherein each of the number ($R_i$) of the time intervals is a next time interval of a corresponding one of the number ($M_i$) of the time intervals and the stock price of each of the stocks rises in each of the number ($R_i$) of the time intervals, and to estimate that the rising probability for each of the stocks in the $(i+1)^{th}$ time interval is equal to $R_i/M_i$ and that the rising average return for each of the stocks in the $(i+1)^{th}$ time interval is equal to an average of stock returns of the corresponding one of the stocks in the number ($R_i$) of the time intervals from corresponding stock return data calculated by the return data calculating module in step S21.

In addition, in step S25, the probability and return calculating module 14 is configured to choose, from the period from first to $i^{th}$ ones of the N time intervals, a number ($F_i$) of the time intervals, which differ from the number ($R_i$) of the time intervals, for each stock corresponding to the $i^{th}$ one of the N time intervals, wherein each of the number ($F_i$) of the time intervals is a next time interval of a corresponding one of the number ($M_i$) of the time intervals and the stock price of the corresponding one of the stocks rises in each of the number ($F_i$) of the time intervals, and to estimate that the falling probability of each stock in the $(i+1)^{th}$ time interval is equal to $F_i/M_i$ and that the falling average return of each stock in the $(i+1)^{th}$ time interval is equal to an average of stock returns of the corresponding stock in the number ($F_i$) of the time intervals from the corresponding stock return data calculated by the return data calculating module 11 in step S21. It is noted that the sum of rising, falling and unchanging probabilities of each stock in any time interval is equal to one. Therefore, the unchanging probability of each stock in the $(i+1)^{th}$ time interval is thus estimated. Similarly, the unchanging average return of each stock in $(i+1)^{th}$ time interval can be estimated.

In other embodiments, the probability and return calculating module 14 can estimate the rising and falling probabilities of each stock in the $(i+1)^{th}$ time interval based on stock returns of the corresponding one of the stocks from corresponding stock return data calculated in step a) using continuous probability density function. Alternatively, the probability and return calculating module 14 can also estimate the rising and falling probabilities of each stock in the $(i+1)^{th}$ time interval using one of conditional probability and Bayesian decision rule. Since the feature of this invention does not reside in the estimation of rising and falling probabilities, which is known to those skilled in the art, details of the same are omitted herein for the sake of brevity.

In step S26, the probability and return calculating module 14 is configured to calculate an expected return, a standard deviation, and an expected return per unit of risk of each stock in the $(i+1)^{th}$ time interval. The expected return of each stock in the $(i+1)^{th}$ time interval is equal to a sum of the product of the rising probability and the rising average return of the corresponding one of the stocks in the $(i+1)^{th}$ time interval estimated in step S25, and the product of the falling probability and the falling average return of the corresponding one of the stocks in the $(i+1)^{th}$ time interval estimated in step S25. Therefore, the expected return of each stock corresponding to a coming time interval, i.e., an $(N+1)^{th}$ time interval, can be obtained when i=N. The standard deviation of each stock in the $(i+1)^{th}$ time interval is determined based on stock returns of the corresponding stock in the number ($M_i$) of the time intervals from the corresponding stock return data calculated in step S21, and indicates a risk value, such as a total risk value or a system risk value. Similarly, the standard deviation of each stock corresponding to the coming time interval can be obtained when i=N. The expected return per unit of risk of each stock in the $(i+1)^{th}$ time interval is equal to the expected return of the corresponding stock in the $(i+1)^{th}$ time interval divided by the standard deviation of the corresponding stock in the $(i+1)^{th}$ time interval. Thus, the expected return per unit of risk of each stock corresponding to the coming time interval can be obtained when i=N. It is noted that the probability and return calculating module 14 further calculates risk per unit of expected return of each stock in the $(i+1)^{th}$ time interval that is equal to a reciprocal of the expected return per unit of risk of the same in the $(i+1)^{th}$ time interval.

In this embodiment, the rising probability, the expected return, the standard deviation and the expected return per unit of risk of each stock corresponding to the coming time interval, i.e., the $(i+1)^{th}$ time interval, constitute analysis data of the corresponding stock corresponding to the coming time interval. On the other hand, an analysis result for each stock generated so far can be output to the client computer 2 through the network 9.

Figure 3:
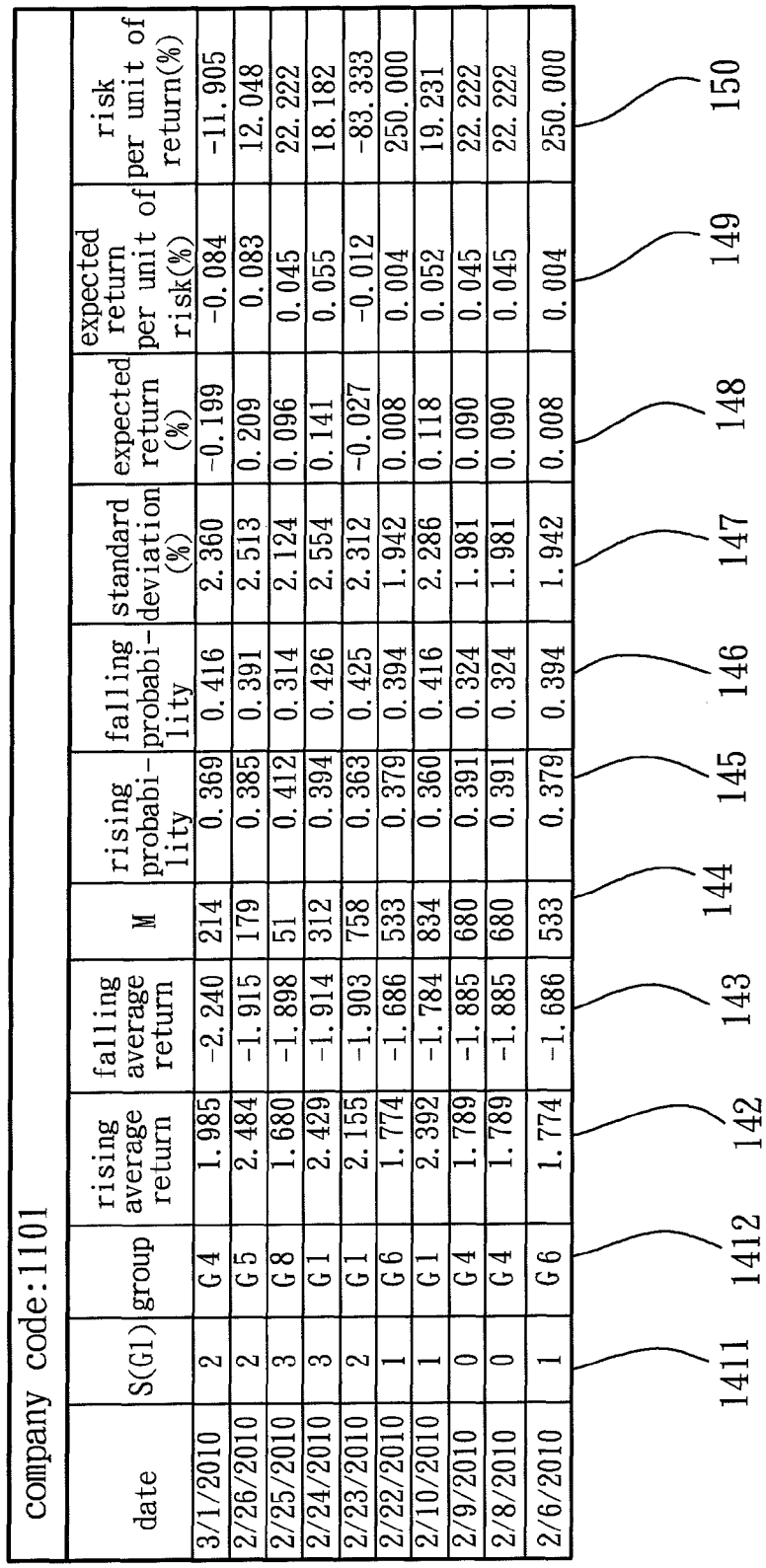
FIG. 3 shows an exemplary analysis result of a stock displayed on a client computer, the analysis result being obtained through the first preferred embodiment using a combination clustering mode.

Referring to FIG. 3, a table is shown to indicate an exemplary analysis result of one stock coded with a company code of "1101" generated by the system server 1 according to the stock analysis method of the first preferred embodiment using the combination clustering mode. The analysis result in the form of a table from the system server 1 can be displayed on the display 23 of the client computer 2. In FIG. 3, the analysis result includes the clustering data associated with the specific group (G1) and consisting of the number (S) 1411 and the corresponding group 1412, the rising average return 142, the falling average return 143, the number (M) 144, the rising probability 145, the falling probability 146, the standard deviation 147, the expected return 148, the expected return per unit of risk 149 and the risk per unit of expected return 150 corresponding to each of consecutive ten historical trading days dated from Feb. 6, 2010 to Mar. 1, 2010.

Referring to FIG. 4, a table is shown to indicate another exemplary analysis result of the same stock as that in FIG. 3 generated by the system server 1 according to the stock analysis method of the first preferred embodiment using the permutation clustering mode. In FIG. 4, similarly, the analysis result includes the clustering data consisting of the corresponding group 1412 and the group permutation pattern 1413, the rising average return 142', the falling average return 143', the number (M) 144', the rising probability 145', the falling probability 146', the standard deviation 147', the expected return 148', the expected return per unit of risk 149' and the risk per unit of expected return 150' corresponding to each of consecutive ten historical trading days dated from Feb. 6, 2010 to Mar. 1, 2010.

In step S27, the determining and sorting module 15 is configured to determine any ones of the stocks, whose analysis data matches predetermined selection criteria, as the target stocks. In this embodiment, the predetermined selection criteria are associated with at least one predetermined expected return threshold, at least one predetermined rising probability threshold and at least one predetermined standard deviation threshold. For example, the predetermined selection criteria include whether the expected return is positive or negative, whether the rising probability is greater or less than the predetermined rising probability threshold, such as 0.5, and whether the standard deviation is less than the predetermined standard deviation. In other embodiments, the predetermined selection criteria are further associated with fundamental indices data as indicated in Table 2, and technical indices based on trading price or trading volume as indicated in Table 3.

TABLE 2

Fundamental indices related financial ratios (Depreciation + depletion + amortization) to net sales˙ Abnormal earnings growth˙ Abnormal Operating income growth˙ Account payable turnover rate (payables turnover)˙ accounts receivable turnover ratio(turnover of receivables)˙ Accounts receivable turnover(Operating revenue)˙ Accounts receivable turnover (ratio)˙ Accumulated depreciation to gross fixed assets˙ Acid-test ratio(quick ratio)˙ After-tax cost of net debt˙ Allowance for doubtful account˙ allowance for doubtful account to loans˙ Asset coverage˙ Asset turnover(total assets turnover)˙ Assets gearing ratio˙ Assets utilization ratio(Assets utilization)˙ Average collection period˙ Average number of days receivables outstanding(day's TABLE 2-continued Fundamental indices related financial ratios sales in receivables)٭ Average number of days to sale inventory٭ Average number of days accounts payable outstanding٭ Average days of net operating cycle٭ Bad debt expense٭ Bank international settlement ratio٭ Bank loan to equity٭ Basic earnings per share٭ Beta (coefficient Beta)٭ Capital distribution per employee٭ Capital expenditure to (Depreciation + depletion + amortization)٭ Capital expenditure to gross fixed assets٭ Capital expenditure to net fixed assets٭ Capital productivity٭ Capital structure ratios(capital structure)٭ Capitalization ratio٭ capital turnover rate٭ Cash dividend٭ Cash flow adequacy ratio٭ Cash flow from operating activities to capital expenditure٭ Cash flow from operating activities to interest expense٭ Cash flow from operating activities to short-term bank loan٭ Cash flow from operating activities to total liabilities٭ Cash flow per share(operating cash flow per share)٭ Cash flow to capital expenditures٭ Cash reinvestment ratio(cash flow reinvestment ratio)٭ Cash turnover٭ Cash debt coverage ratio٭ Cash flow to fixed charges ratio٭ Cash to current assets ratio٭ Cash to current liabilities ratio٭ CFO to debt٭ Change in Return on Common stockholder's equity(Change in ROCE)٭ Change in Return on net operating assets(Change in RNOA)٭ Common stock Net worth Per share(Book Value Per share)٭ contingencies to equity٭ Contribution margin ratio٭ Core Sales profit margin٭ Cost of capital for operations٭ current (liquid) assets to total liability٭ current (liquid) assets to total assets٭ current (liquid) assets turnover rate٭ current liabilities turnover٭ current liability to total liability٭ current liability to equity٭ current liability to inventory٭ Current ratio٭ Current yield٭ Days payables outstanding (Days in accounts payable)٭ Days purchase in accounts payable٭ Days receivables outstanding (day's sales in receivables)٭ Days sales in inventory(days inventory outstanding)٭ Days to sell inventory ratio٭ Debt ratio٭ debt to capital ratio٭ debt to equity ratio٭ Debt to total assets٭ Defensive interval٭ Degree of combined leverage٭ Degree of financial leverage٭ Degree of Operational Leverage٭ degree of total leverage٭ Depreciable Fixed Assets Growth Ratio(YOY %-Fixed Assets)٭ Depreciation + depletion to gross depreciated assets٭ Depreciation to net sales ratio٭ Discretionary cash flow٭ Diluted earnings per share٭ Diluted EPS٭ Discretionary cash flow to total liabilities٭ Discriminate score٭ Dividend payout ratio(Dividend payout)٭ Dividend growth rate٭ Dividend value index٭ Dividend-adjusted P/E ratio٭ Dividends per share٭ Dividends-to-book value٭ Dividend Value Index٭ Dividend yield ratio٭ Dividend Yield٭ Dupont return on investment٭ Earnings leverage٭ Earnings/Price Ratio٭ earnings yield٭ earnings before income taxes٭ Earnings Per Share٭ Earnings Value Index٭ Earnings before interest and tax٭ Earnings before taxes٭ Economic income٭ Economic value added٭ Effective tax rate for operations٭ Enterprise P/B ratio٭ Unlevered P/B ratio٭ Enterprise P/E ratio٭ Unlevered P/E ratio٭ Equity growth rate٭ equity multiplier٭ Equity ratio٭ Equity to assets٭ equity to fixed assets٭ Equity turnover٭ Expense ratio٭ favorable leverage٭ favorable gearing٭ Financial income before tax٭ Financial asset composition ratio٭ Financial income contribution ratio٭ Financial leverage٭ financial structure٭ Financial leverage index٭ Financial leverage multiplier٭ Financial leverage ratio(Financial Leverage)٭ Financial liability composition ratio٭ Financial structure ratio(financial structure)٭ fixed asset per employee٭ Fixed asset ratio٭ Fixed asset turnover٭ Fixed assets to assets٭ Fixed assets to capitalization٭ Fixed assets to equity٭ fixed assets productivity٭ fixed capital growth rate٭ Fixed charge coverage٭ Forward Enterprise P/E ratio(Levered P/E ratio)٭ Forward P/E ratio(Leading P/E ratio)٭ Free cash flow٭ Gross Margin Growth٭ gross margin of sales٭ Gross profit margin(gross profit ratio/margin)٭ Gross profit ratio/margin٭ Gross profit margin٭ Gross profit/gross loss٭ Growth rate in Common stockholder's equity(Growth rate in CSE)٭ Growth rate in net operating assets (Growth rate in NOA)٭ Growth rate in operating income٭ Growth rate in Residual Operating income(Residual Operating income one-year ahead)٭ Growth rate in Sales(Sales Growth)٭ Growth rate of common equity٭ Implicit interest on Operating liabilities٭ Interest expense to sales٭ interest cover ratio(Interest coverage)٭ internal growth rate٭ internal rate of return٭ inventory turnover ratio(Inventory turnover)٭ inventory conversion period٭ inventory processing period(inventory turnover in days)٭ inventory to operating capital٭ Jensen index٭ Jensen's alpha٭ land to equity٭ Leverage ratio٭ Leverage-adjusted ROCE٭ Levered forward P/E ratio٭ Long-term bank loan to equity٭ long-term debt ratio٭ Long-term debt to equity٭ long-term debt to equity capital ratio٭ Long-term debt to total assets٭ long-term investments ratio٭ marginal contribution per employee٭ market value٭ market-book value ratio٭ Minority interest sharing ratio٭ market-to-book ratio٭ net earnings growth rate٭ net earnings rate (before tax)٭ Net (comprehensive) income profit margin٭ net assets turnover٭ Net borrowing cost٭ net income٭ Net Income Growth٭ Net Income Growth Rate-Quarterly(QOQ %-Net Income)٭ net income margin٭ net income to equity٭ net income to operating capital٭ net income to sales٭ Net investment rate٭ net operating cycle٭ net operating asset turnover٭ net operating profit after taxes٭ net operating profit margin٭ net operating working capital٭ net profit growth rate٭ net profit growth rate (after tax)٭ net profit growth rate (before tax)٭ net profit margin٭ Net profit margin (after tax)٭ Net profit margin (before tax)٭ net profit rate (after tax)٭ net profit rate (before tax)٭ net profit to issued capital (before tax)٭ net profit to total capital (after tax)٭ net profit to total capital (before tax)٭ Net worth Per share(Book Value Per share)٭ net working capital٭ Normal forward P/E٭ Normal trailing P/E٭ net earnings growth rate٭ net earnings rate (before tax)٭ Net (comprehensive) income profit margin٭ net assets turnover٭ Net borrowing cost٭ net income٭ Net Income Growth٭ Net Income Growth Rate-Quarterly(QOQ %-Net Income)٭ net income margin٭ net income to equity٭ net income to operating capital٭ net income to sales٭ Net investment rate٭ net operating cycle٭ net operating asset turnover٭ net operating profit after taxes٭ net operating profit margin٭ net operating working capital٭ net profit growth rate٭ net profit growth rate (after tax)٭ net profit growth rate (before tax)٭ net profit margin٭ Net profit margin (after tax)٭ Net profit margin (before tax)٭ net profit rate (after tax)٭ net profit rate (before tax)٭ net profit to issued capital (before tax)٭ net profit to total capital (after tax)٭ net profit to total capital (before tax)٭ Net worth Per share(Book Value Per share)٭ net working capital٭ Normal forward P/E٭ Normal trailing P/E٭ Operating asset composition ratio٭ Operating capital turnover٭ operating cash flow to total debt ratio٭ operating cost ratio٭ operating cycle٭ operating equipment turnover rate٭ operating expense to net sales٭ Operating Income Growth Rate- Quarterly (QOQ %-Operating Inc.)٭ operating income margin٭ Operating Income Per Share٭ Operating liability composition ratio٭ Operating liability leverage٭ operating profit margin٭ Operating profit ratio٭ Operating profit ratio (less interest expense)٭ Operating spread between the return on net operating

TABLE 2-continued

Fundamental indices related financial ratios asset and the net borrowing cost* operating profit to issued capital* Other items profit margin* out of pocket cost of capital*
par value (face value)* payables payment period* PEG ratio* percentage change in core operating income ahead(% change in core operating income ahead)* Percentage of Earnings retained* Pre_Tax Income Growth-YoY %* Pre_Tax Income Per Share* Preferred stock Net worth Per share* price-to-dividend ratio(Ratio of dividend/price to dividend ratio)* price-to-earnings ratio(price-earnings(P/E) ratio)* profit growth rate* profitability ratio* Property, plant, and equipment(net) turnover(fixed asset turnover)*
rate of contribution margin* rate of return on investment(return on investment)* realized sales growth rate* receivables collection period* receivables turnover in days* relative value ratio* required rate of return* Required return for operations* Required return on equity* Retention Ratio* return of equity (before tax)* Return on assets* Return on assets (after tax, interest expense excluded)* Return on assets (after tax, interest expense included)* Return on assets (before tax, interest expense excluded)* return on assets (before tax)* Return on assets (before tax, interest expense included)* return on long-term capital* Return on Capital* Return on common equity(return on equity)* Return on Common stockholder's equity(return on common equity)* Return on Common stockholder's equity before Minority interest (MI)(ROCE before Minority interest (MI))* Return on equity (after tax)* Return on equity (before tax)* Return on net financial assets* Return on net operating assets* Return on operating assets* Return on Operating Assets-after tax Short-term borrowing rate* return on equity* return on invested capital* return on net operating assets* Revenue Growth Rate-Quarterly (QOQ %-Sales)* Rolling P/E ratio*
sales growth rate* sales per manpower* sales to account receivables* sales to cash* sales to current (liquid) assets* sales to equity* sales to fixed assets* sales to inventory* sales to net income* sales to operating capital* sales to operating capital* sales to total assets* Sales Per Share* Sales profit margin* sales to inventory ratio* Short-term bank loan to current assets* short-term borrowings (debt)(short-term loan)* short-term liquidity ratio(short-term liabilities)* short-term defensive interval ratio(short-term coverage ratio)* stock dividend* Sum of Expense ratios* sustainable growth rate* systematic risk*
the intrinsic price-to-book ratios(the intrinsic P/B ratios)* The Price-to-Book(P/B) ratio(Price Book ratio)* The sensitivity of income to changes in sales(Operating leverage)* The standard P/B ratio for the equity(levered P/B ratio)* times interest earned ratio(time interest earned)* Times interest earned ratio (plus depreciation and amortization)* Times Preferred Stock Dividend Earned* Total asset turnover* Total Assets Growth (YOY %-Total Assets)* Total Equity Growth (YOY %-Total Equity)* Total payout ratio* Total payout-to-book value* Trailing Enterprise P/E ratio* Trailing P/E ratio* Treynor index* turnover of assets* Unlevered Price/EBIT ratio* Unlevered Price/EBITda ratio* Unlevered Price/Sales ratio* Unlevered price-to-book ratios*
Value added per employee* value-added growth rate* working capital turnover*
YoY %-Return on Total Asset*

TABLE 3

Technical indices

Absolute Breadth Index* Acceleration/Deceleration Oscillator* Accumulation* Accumulation/Distribution* Accumulation/Distribution of volume* Accumulation Swing Index* adjusted debit balance bearish* adjusted debit balance finance* Advance/Decline Line(A/D Line)* Advance Decline Ratio(A/D Ratio) Advance/Decline Line Breadth* Advancing-Declining issues* Alexander's Filter* Alligator* Alpha* Alpha Jensen* Andrew's Pitchforks* Arms Index* Aroon* Aroon Oscillator* Average Directional Movement Index Rating(Average Directional Index)* Average Directional Movement index of stock price(Average Directional Index Rating)* Average Price* Average True Range* Awesome Oscillator*
Bearish Divergence* Beta* Beta Factor* BIAS* Binary Wave* Bollinger Bandwidth* Bollinger Bands* Bollinger on Bollinger Bands* Bolton-Tremblay Indicator* Box Ratio* Breadth Thrust Index* Bretz TRIN-5* Bull And Bear Index* Bull and Bear Index Bollinger Band* Bull/Bear Ratio* Bullish Divergence*
Candle sticks(Candlesticks)* Candle volume* CANSLIM* Chaikin Money Flow* Chaikin Oscillator* Chaikin Volatility* Chande Momentum Oscillator* Chaos Fractal Bands* Chaos Fractal Oscillator* Chaos Gator* Chicago Floor Trading Pivotal Point* Chinkou span* Close Line* Commodity Channel Index* Commodity Channel Index Standard* Comparative Performance* Comparative Relative Strength Index* Comparative Strength* Coppock Curve* Counter-clockwise* Cumulative Advance Decline Line* Cumulative positive development* Cumulative Stock Market Thrust* Cumulative Sum* Cumulative Volume Index* Cutler's RSI*
D Stochastic Line(D Line)* Demand Index* Detrended Price Oscillator* De-trended Price* Difference* Different of Moving Average* Directional Indicator* Directional Movement Index* Disparity Index* Displaced MA* Distribution(D)* Double exponential moving average* Double-Smoothed Stochastic* Dynamic momentum*
Ease of Movement* Ehlers Fisher Transform* Elder Ray* Elder Ray Bear Power* Elliott Oscillator* Envelope Percent(Trading Bands)* Envelope* Equivolume* Equivolume Charting(Power Candle Stick)* Error Channels* Exponential Smoothing Moving Average* Fast stochastic* Fibonacci Arcs* Fibonacci Fans* Fibonacci phi-Channel* Fibonacci Retracements* Fibonacci Spiral* Fibonacci studies* Fibonacci Time Goals* Fibonacci Time Zones* filter rule* Fisher Transform* Force Index* Forecast Moving Average* Forecast Oscillator* Forex pivot point calculator* Four percent model* Fractals* Full stochastic* Gann angles* Gann Fan* Gator Oscillator* General Stochastic Calculation*
Haurian index* Herrick Payoff Index* High Low Bands* High Minus Low* High-Low-Close-Open chart(HLCO Bars)* Historical Volatility*
Inertia* Intraday Momentum Index
K Stochastic Line(K Line)* Keltner Channel* Kijun sen indicator* Kinder % R(K % R)* Klinger Oscillator* Known Sure Thing
Large Block ratio* Linear Regression channel* Linear Regression Slope*
MACD Oscillator* Market Facilitation Index(BW MFI)* Market Thrust* Market Volatility* Mass Index* McClellan Oscillator* McClellan Summation Index(McClellan Summation)* Median Price* Member short ratio* Minus Directional Movement* Momentum* Money Flow Index * Money Flow Relative Strength Index* Moving Average Channel* Moving Average Convergence and Divergence* Moving Average of stock price* Moving Average OHLC* Moving Average Variable*
Negative Money Flow* Negative Volume Index* Net Momentum Oscillator* net tick volume(tick volume)* New Highs-Lows Ratio(New High/Lows Ratio)* New Highs-Lows Cumulative* New Highs-New Lows* Normalized Envelope Indicator* Notis Percent V(Notis % V)* Odd Lot Balance Index* Odd lot purchases/sales* Odd Lot Short Ratio* Odds probability cones* On Balance Volume* Open-10 TRIN* Open-High-Low-Close chart(OHLC chart)*

TABLE 3-continued

Technical indices

Oscillator‵ Oscillator of moving averages‵
Overbought/Oversold‵ OX Bars‵
Parabolic Stop And Reversal(Parabolic SAR)‵ Patterns‵
Pivot‵ Pivot points‵ Plus Directional Movement‵
Polarized Fractal Efficiency‵ Positive Money Flow‵
Positive Volume Index‵ Price Channel‵ price filter
rule‵ Price Oscillator‵ Price Rate Of Change‵ Projection
Bands‵ Projection Oscillator‵ Psychological Line‵
Public short ratio‵
Quadrant Lines‵ Quantitative Candle Stick‵
Rainbow Oscillator‵ Range Expansion Index‵ Range
indicator‵ Rate of change‵ Raw Stochastic Value‵
Relative Momentum Index‵ Relative Strength Index‵
Relative Volatility Index‵ Revised balance Volume of
trading
Short term Trading Index(Trader's Index)‵ Short term
Trading Index(ARMS's Index)‵ Smoothing Thrust Index‵
Speed resistance line‵ Standard Deviation Channel‵
STARC Bands‵ STIX‵ Stochastic Relative Strength
Index(Stochastic RSI)‵ Stochastic Line‵ Stochastic
Momentum Index‵ Stochastic Momentum‵ Stochastic
Oscillator‵ Stochastic Fast‵ Stochastic Slow‵ Stock
Market Thrust‵ Stop & Reverse(Parabolic trading
system)‵ Swing Indicator of stock price(Swing Index)
Tenkan Sen(Ichimoku Kinko Hyo)‵ Three Line Break‵ Thrust
Oscillator‵ time filter rule‵ Tirone levels‵ Tom Demark
Moving Average‵ Tom Demark Range Projection‵ Total
Amount Per Weighted Stock Price Index‵ Total Short
Ratio‵ Trade Volume Index‵ Trend Lines‵ Triple
Exponentially Moving Average(Triple Exponentially
Smoothed Moving Average)‵ True range‵ True Strength
Index‵ Typical Price‵ Typical Price Of Symbol‵
Ultimate Oscillator‵ Upside/Downside Ratio‵
Upside/Downside Volume‵
Vertical Horizontal Filter‵ Volatility Chaikin‵
Volatility Wilder‵ Volume‵ Volume Accumulation‵ Volume
Accumulation Distribution‵ Volume Adjusted Moving
Average‵ Volume Average‵ Volume by price‵ Volume
Oscillator‵ Volume+‵ Volume Price Trend‵ Volume Rate
Of Change‵ Volume Ratio‵
Weighed Close‵ Weighted Moving Average‵ Weighted
Relative Strength Index‵ Welles Wilder RSI‵ Welles
Wilder Summation‵ Wilder's Smoothing indicator‵ Welles
Wilders Volatility Index(Wilders Volatility Index)‵
Williams' Accumulation/Distribution‵ Williams'
% R(Williams' Oscillator)‵ Williams' Overbought
Oversold Index of stock price(Over Buy/Over Sell)‵
Williams Accumulation Distribution‵
ZIG ZAG indicator(ZIG ZAG)

In step S28, the determining and sorting module 15 is further configured to sort the target stocks with the expected return per unit of risk or the risk per unit of expected return thereof corresponding to the coming time interval. A sorting result generated by the system server 1 can be output to the client computer 2 through the network 9.

Referring to FIG. 5, a table is shown to indicate an exemplary sorting result related to ten target stocks generated by the system server 1 and sorted with the expected return per unit of risk 169 according to the stock analysis method of the first preferred embodiment using the combination clustering mode. The sorting result in the form of a table from the system server 1 can be displayed on the display 23 of the client computer 2. In FIG. 5, the rising probability 165 of each target stock corresponding to the coming trading day dated on Mar. 2, 2010 is greater than the predetermined rising probability threshold of 0.5, the standard deviation 167 of each target stock corresponding to the coming trading day is less than the predetermined standard deviation threshold of 4, and the expected return 168 of each target stock corresponding to the coming trading day is positive. From the sorting result, the stock coded with the company code of "3518" having the highest expected return per unit of risk, i.e., 0.628%, may be a candidate stock to be bought on Mar. 2, 2010.

Referring to FIG. 6, a table is shown to indicate another exemplary sorting result related to ten target stocks generated by the system server 1 and sorted with the risk per unit of expected return per unit 170 according to the stock analysis method of the first preferred embodiment using the permutation clustering mode. In FIG. 6, the rising probability 165' of each target stock corresponding to the coming trading day dated on Mar. 2, 2010 is less than the predetermined rising probability threshold of 0.5, the standard deviation 167' of each target stock corresponding to the coming trading day is less than the predetermined standard deviation threshold of 4, and the expected return 168' of each target stock corresponding to the coming trading day is negative. From the sorting result, the stock coded with the company code of "6265" having the lowest risk per unit of expected return, i.e., −74.823%, may be a candidate stock to be sold on Mar. 2, 2010.

Figure 7:
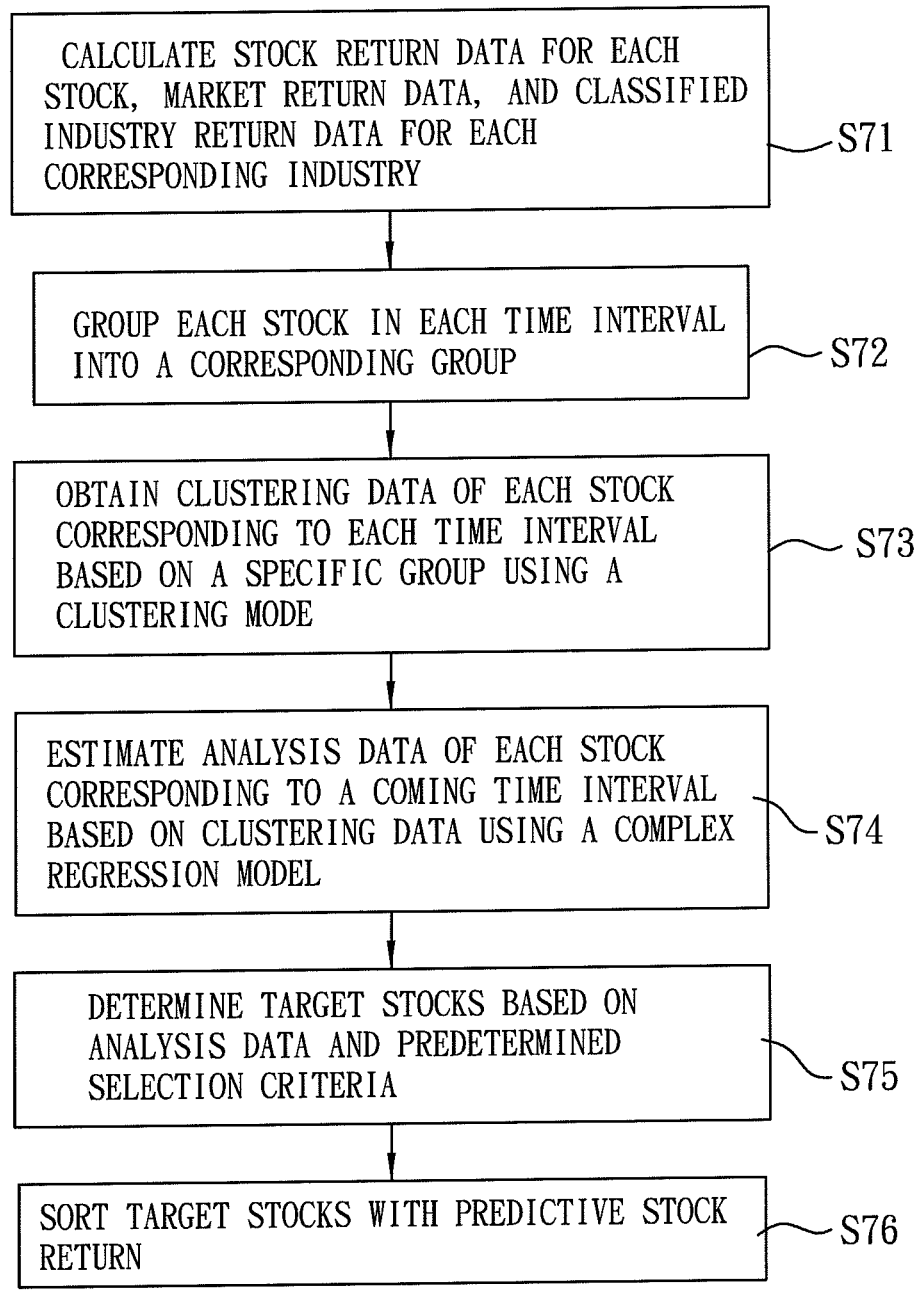
FIG. 7 is a flowchart to illustrate a second preferred embodiment of a stock analysis method according to the present invention.

FIG. 7 is a flowchart to illustrate a second preferred embodiment of a stock analysis method according to the present invention, which is a modification of the first preferred embodiment.

In step S71, similar to step S21 of FIG. 2, the return data calculating module 11 calculates the stock return data of each stock, the market return data, and the classified industry return of each corresponding classified industry based on historical stock price information within the historical trading period.

In step S72, similar to step S22 of FIG. 2, the grouping module 12 groups each stock in each time interval into a corresponding one of the eight groups (G1, G2, . . . , G8).

In step S73, similar to step S23 of FIG. 2, the clustering module 13 obtains the clustering data of each stock corresponding to each time interval based on a specific one of the groups (G1, G2, . . . , G8).

In step S74, the regression calculating module 16 is configured to generate regression results of each stock based on the clustering data obtained in step S73 using a multivariate regression model. The regression results generated by the regression calculating module 16 can be output to the client computer 2 through the network 9. Similar to the first preferred embodiment, the time interval is equal to a trading day. It is noted that the multivariate regression model is established based on an index model and multifactor models. For the index model, a security characteristic line can be expressed as the following regression formula:

$$Y_t = f(X_t) + e_t$$

where $Y_t$ represents the stock daily return, and $X_t$ represents the weighted stock price index daily return. By adding control variables, the above regression formula can be changed into the following multivariate regression formula:

$$Y_t = f(X_t; \text{ control variables}) + e_t$$

In addition, the predictive capability of the multivariate regression model can be examined by the following errors and U value:

$$\text{Root-mean-square }(RMS)\text{ error} = \sqrt{\frac{1}{T}\sum_{t=1}^{T}(Y_t^s - Y_t^a)^2} \quad (1)$$

where $Y_t^s$ is a simulation or predictive value of $Y_t$, $Y_t^a$ is a reality value, and; T is the number of simulation time intervals.

$$RMS \text{ Percent Error} = \sqrt{\frac{1}{T}\sum_{t=1}^{T}\left(\frac{Y_t^s - Y_t^a}{Y_t^a}\right)^2} \quad (2)$$

$$\text{Mean Simulation Error} = \frac{1}{T}\sum_{t=1}^{T}(Y_t^s - Y_t^a) \quad (3)$$

$$\text{Mean Percent Error} = \frac{1}{T}\sum_{t=1}^{T}\left(\frac{Y_t^s - T_t^a}{Y_t^a}\right) \quad (4)$$

$$\text{Theil inequality coefficient } (U \text{ value}) = \frac{\sqrt{\frac{1}{T}\sum_{t}(Y_t^s - Y_t^a)^2}}{\sqrt{\frac{1}{T}\sum_{t}(Y_t^s)^2} + \sqrt{\frac{1}{T}\sum_{t}(Y_t^a)^2}} \quad (5)$$

Referring to FIG. 8a, a table is shown to indicate an exemplary regression result predicted by the second preferred embodiment based on corresponding stock return data of a stock coded by company code of "1101" using the multivariate regression model, wherein the exemplary regression result corresponds to the clustering data associated with the specific group (G1) and obtained using the combination clustering mode. Referring to FIG. 8b, a table is shown to indicate another exemplary regression result predicted by the second preferred embodiment based on the corresponding stock return of the same stock using the multivariate regression model, wherein the exemplary regression result corresponds to the clustering data associated with the group permutation pattern of "G1-G1-G1" and obtained using the permutation clustering mode.

From the regression results of FIGS. 8a and 8b, the adjusted R-squared values of 0.7749 and 0.7752 are greater than 0.4616, which is an adjusted R-squared value obtained without consideration of clustering data. Therefore, it is apparent that the multivariate regression model has a superior predictive capability. Then, the regression calculating module 16 calculates a predictive stock return of each stock corresponding to the coming trading day based on the predictive weighted stock price index daily return of the corresponding stock. In this case, the predictive stock return of each stock corresponding to the coming trading day serves as the analysis data of the same.

In step S75, the determining and sorting module 15 is configured to determine any ones of the stocks, whose analysis data, i.e., the predictive stock returns, matches predetermined selection criteria, as the target stocks. In this embodiment, the predetermined selection criteria are associated with a predetermined stock return threshold. For example, the predetermined selection criteria include whether the predictive stock return is greater or less than the predetermined stock return threshold.

In step S76 the determining and sorting module 15 is configured to sort the target stocks with the predictive stock return.

In sum, relationships among performance of each stock, performance of a corresponding classified industry and a performance of market are taken into account in the stock analysis method of the present invention takes. As compared to the prior art only performance of stock taken into account, the stock analysis method of this invention can thus obtain a superior analysis result so as to facilitate to selection of target stocks to be brought/sold, thereby ensuring a relatively high return.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A stock analysis method for performing an analysis on a plurality of stocks to select target ones to be bought/sold from the stocks, the company of each of the stocks belonging to a corresponding classified industry, said stock analysis method comprising the steps of:
   a) calculating stock return data of each of the stocks, market return data, and classified industry return data of each of the corresponding classified industries based on historical stock price information within a historical trading period that includes a current trading period and that consists of a number (N) of consecutive time intervals;
   b) according to the stock return data, the market return data and the classified industry return data obtained in step a), determining
   whether a stock return of each of the stocks in each of the N time intervals is greater than a classified industry return of the corresponding classified industry in a corresponding one of the N time intervals,
   whether the stock return of each of the stocks in the corresponding one of the N time intervals is greater than a market return in the corresponding one of the N time intervals, and
   whether the classified industry return of the corresponding one of the classified industries in the corresponding one of the N time intervals is greater than the market return in the corresponding one of the N time intervals;
   c) based on results determined in step b), grouping the stocks so that each of the stocks in each of the N time intervals is grouped into a corresponding one of a number (G) of different groups;
   d) obtaining clustering data of each of the stocks corresponding to each of the N time intervals and associated with the groups based on a specific one of the groups using a clustering mode;
   e) estimating by a computer, analysis data of each of the stocks corresponding to a coming time interval based on at least the clustering data obtained in step d); and
   f) determining any ones of the stocks whose analysis data estimated in step e) matches predetermined selection criteria as the target ones of the stocks;
   wherein, in step d):
   the clustering mode is one of a combination clustering mode and a permutation clustering mode;
   in the combination clustering mode, the clustering data of each of the stocks corresponding to an $i^{th}$ one of the N time intervals includes the corresponding one of the groups in the $i^{th}$ one of the N time intervals, and a number ($S_i$) of the time intervals in a reference period from $[i-(Q-1)]^{th}$ to $i^{th}$ ones of the N time intervals, where $1 \leq i \leq N$ and $2 \leq Q \leq i$, wherein a corresponding one of the stocks is grouped into said specific one of the groups in the number ($S_i$) of the time intervals; and
   in the permutation clustering mode, the clustering data of each of the stocks corresponding to the $i^{th}$ one of the N time intervals includes the corresponding one of the groups in the $i^{th}$ one of the N time intervals, and group permutation pattern consisting of the corresponding ones of the groups that correspond respectively to $[i-(Q-1)]^{th}$ to $i^{th}$ ones of the N time intervals.

2. The stock analysis method as claimed in claim 1, wherein, in step c), G=8, where
- a first group represents that the classified industry return is greater than the market return, and that stock return is greater than the classified industry return and the market return,
- a second group represents that the classified industry return is greater than the market return, that the stock return is greater than the classified industry return, and that the stock return is not greater than the market return,
- a third group represents that the classified industry return is greater than the market return, that the stock return is not greater than the classified industry return, and that the stock return is greater than the market return,
- a fourth group represents that the classified industry return is greater than the market return, that the stock return is not greater than the classified industry return and the market return,
- a fifth group represents that the classified industry return is not greater than the market return, and that stock return is greater than the classified industry return and the market return,
- a sixth group represents that the classified industry return is not greater than the market return, that the stock return is greater than the classified industry return, and that the stock return is not greater than the market return,
- a seven group represents that the classified industry return is not greater than the market return, that the stock return is not greater than the classified industry return, and that the stock return is greater than the market return, and
- an eighth group represents that the classified industry return is not greater than the market return, that the stock return is not greater than the classified industry return and the market return.

3. The stock analysis method as claimed in claim 1, wherein each of the current trading period and the time interval is equal to one trading day.

4. The stock analysis method as claimed in claim 1, prior to step e), further comprising the steps of:
- d1) choosing, from first to $(i-1)^{th}$ ones of the N time intervals, a number $(M_i)$ of the time intervals for each of the stocks corresponding to the $i^{th}$ one of the N time intervals from a period, wherein the clustering data of each of the stocks in each of the number $(M_i)$ of the time intervals is identical to that in the $i^{th}$ one of the N time intervals; and
- d2) estimating rising and falling probabilities, and rising and falling average returns of each of the stocks in an $(i+1)^{th}$ time interval according to the number $(M_i)$ of the time intervals chosen in step d1).

5. The stock analysis method as claimed in claim 4, wherein step d2) includes the sub-steps of:
- d21) choosing, from a period from first to ith ones of the N time intervals, a number $(R_i)$ of the time intervals for each of the stocks corresponding to the $i^{th}$ one of the N time intervals, wherein each of the number $(R_i)$ of the time intervals is a next time interval of a corresponding one of the number $(M_i)$ of the time intervals and the stock price of each of the stocks rises in each of the number $(R_i)$ of the time intervals, and estimating that the rising probability of each of the stocks in the $(i+1)^{th}$ time interval is equal to $R_i/M_i$ and that the rising average return of each of the stocks in the $(i+1)^{th}$ time interval is equal to an average of stock returns of the corresponding one of the stocks in the number $(R_i)$ of the time intervals from corresponding stock return data calculated in step a); and
- d22) choosing, from the period from first to $i^{th}$ ones of the N time intervals, a number $(F_i)$ of the time intervals, which differ from the number $(R_i)$ of the time intervals, for each of the stocks corresponding to the $i^{th}$ one of the N time intervals, wherein each of the number $(F_i)$ of the time intervals is a next time interval of a corresponding one of the number $(M_i)$ of the time intervals and the stock price of the corresponding one of the stocks rises in each of the number $(F_i)$ of the time intervals, and estimating that the falling probability of each of the stocks in the $(i+1)^{th}$ time interval is equal to $F_i/M_i$ and that the falling average return of each of the stocks in the $(i+1)^{th}$ time interval is equal to an average of stock returns of the corresponding one of the stocks in the number $(F_i)$ of the time intervals from the corresponding stock return data calculated in step a).

6. The stock analysis method as claimed in claim 4, wherein, in step d2), the rising and falling probabilities of each of the stocks in the $(i+1)^{th}$ time interval are estimated based on stock returns of the corresponding one of the stocks from corresponding stock return data calculated in step a) using continuous probability density function.

7. The stock analysis method as claimed in claim 4, wherein, in step d2), the rising and falling probabilities of each of the stocks in the $(i+1)^{th}$ time interval are estimated using one of conditional probability and Bayer's decision rule.

8. The stock analysis method as claimed in claim 4, wherein, in step e):
- the analysis data includes the rising probability, an expected return, a standard deviation, and an expected return per unit of risk of each of the stocks corresponding to the coming time interval;
- the expected return of each of the stocks in the $(i+1)^{th}$ time interval is equal to a sum of the product of the rising probability and the rising average return of the corresponding one of the stocks in the $(i+1)^{th}$ time interval estimated in step d2), and the product of the falling probability and the falling average return of the corresponding one of the stocks in the $(i+1)^{th}$ time interval estimated in step d2) such that the expected return of each of the stocks corresponding to the coming time interval is obtained when i=N;
- the standard deviation of each of the stocks in the $(i+1)^{th}$ time interval is determined based on stock returns of the corresponding one of the stocks in the number $(M_i)$ of the time intervals from the corresponding stock return data calculated in step a), and indicates a risk value such that the standard deviation of each of the stocks corresponding to the coming time interval is obtained when i=N; and
- the expected return per unit of risk of each of the stocks in the $(i+1)^{th}$ time interval is equal to the expected return of the corresponding one of the stocks in the $(i+1)^{th}$ time interval divided by the standard deviation of the corresponding one of the stocks in the $(i+1)^{th}$ time interval such that the expected return per unit of risk of each of the stocks corresponding to the coming time interval is obtained when i=N, the expected return per unit of risk of each of the stocks in the $(i+1)^{th}$ time interval being a reciprocal of risk per unit of expected return of the corresponding one of the stocks in the $(i+1)^{th}$ time interval.

9. The stock analysis method as claimed in claim 8, wherein, in step f), the predetermined selection criteria are associated with at least one predetermined expected return threshold, at least one predetermined rising probability threshold and at least one predetermined standard deviation threshold, said stock analysis method further comprising the step of:

g) sorting the target ones of the stocks with the expected return per unit of risk or the risk per unit of expected return corresponding to the coming time interval.

10. The stock analysis method as claimed in claim 9, wherein the predetermined selection criteria further are further associated with fundamental data, and technical indices based on trading price or trading volume.

11. The stock analysis method as claimed in claim 1, wherein, in step e), the analysis data of each of the stocks corresponding to the coming time interval includes a predictive stock return that is obtained based on the clustering data of the corresponding one of the stocks corresponding to the coming time interval using a multivariate regression model.

12. The stock analysis method as claimed in claim 11, wherein, in step f), the predetermined selection criteria are associated with a predetermined stock return threshold, said stock analysis method further comprising the step of:

g) sorting the target ones of the stocks with the predictive stock return corresponding to the coming time interval.

13. A computer program product comprising a non-transitory computer readable medium storing instructions for causing a computer to perform consecutive steps of:

a stock analysis method for performing an analysis on a plurality of stocks to select target ones to be bought/sold from the stocks, the company of each of the stocks belonging to a corresponding classified industry, the stock analysis method including the steps of:

a) calculating stock return data of each of the stocks, market return data, and classified industry return data of each of the corresponding classified industries based on historical stock price information within a historical trading period that includes a current trading period and that consists of a number (N) of consecutive time intervals;

b) according to the stock return data, the market return data and the classified industry return data obtained in step a), determining whether a stock return of each of the stocks in each of the N time intervals is greater than a classified industry return of the corresponding classified industry in a corresponding one of the N time intervals, whether the stock return of each of the stocks in the corresponding one of the N time intervals is greater than a market return in the corresponding one of the N time intervals, and whether the classified industry return of the corresponding one of the classified industries in the corresponding one of the N time intervals is greater than the market return in the corresponding one of the N time intervals;

c) based on results determined in step b), grouping the stocks so that each of the stocks in each of the N time intervals is grouped into a corresponding one of a number (G) of different groups;

d) obtaining clustering data of each of the stocks corresponding to each of the N time intervals and associated with the groups based on a specific one of the groups using a clustering mode;

e) estimating analysis data of each of the stocks corresponding to a coming time interval based on at least the clustering data obtained in step d); and f) determining any ones of the stocks whose analysis data estimated in step e) matches predetermined selection criteria as the target ones of the stocks;

wherein, in step d):

the clustering mode is one of a combination clustering mode and a permutation clustering mode;

in the combination clustering mode, the clustering data of each of the stocks corresponding to an $i^{th}$ one of the N time intervals includes the corresponding one of the groups in the $i^{th}$ one of the N time intervals, and a number ($S_i$) of the time intervals in a reference period from $[i-(Q-1)]^{th}$ to $i^{th}$ ones of the N time intervals, where $1 \leq i \leq N$ and $2 \leq Q \leq i$, wherein a corresponding one of the stocks is grouped into said specific one of the groups in the number ($S_i$) of the time intervals; and in the permutation clustering mode, the clustering data of each of the stocks corresponding to the $i^{th}$ one of the N time intervals includes the corresponding one of the groups in the $i^{th}$ one of the N time intervals, and group permutation pattern consisting of the corresponding ones of the groups that correspond respectively to $[i-(Q-1)]^{th}$ to $i^{th}$ ones of the N time intervals.

14. A system for performing an analysis on a plurality of stocks to select target ones to be bought/sold from the stocks, the company of each of the stocks belonging to a corresponding classified industry, the system comprising: one processor and a non-transitory computer readable medium, wherein the non-transitory computer readable medium stores instructions that when executed by the processor, causes the processor to perform the steps of:

a) calculating stock return data of each of the stocks, market return data, and classified industry return data of each of the corresponding classified industries based on historical stock price information within a historical trading period that includes a current trading period and that consists of a number (N) of consecutive time intervals;

b) according to the stock return data, the market return data and the classified industry return data obtained in step a), determining whether a stock return of each of the stocks in each of the N time intervals is greater than a classified industry return of the corresponding classified industry in a corresponding one of the N time intervals, whether the stock return of each of the stocks in the corresponding one of the N time intervals is greater than a market return in the corresponding one of the N time intervals, and whether the classified industry return of the corresponding one of the classified industries in the corresponding one of the N time intervals is greater than the market return in the corresponding one of the N time intervals;

c) based on results determined in step b), grouping the stocks so that each of the stocks in each of the N time intervals is grouped into a corresponding one of a number (G) of different groups;

d) obtaining clustering data of each of the stocks corresponding to each of the N time intervals and associated with the groups based on a specific one of the groups using a clustering mode;

e) estimating analysis data of each of the stocks corresponding to a coming time interval based on at least the clustering data obtained in step d); and f) determining any ones of the stocks whose analysis data estimated in step e) matches predetermined selection criteria as the target ones of the stocks; wherein, in step d):

the clustering mode is one of a combination clustering mode and a permutation clustering mode;

in the combination clustering mode, the clustering data of each of the stocks corresponding to an $i^{th}$ one of the N time intervals includes the corresponding one of the groups in the $i^{th}$ one of the N time intervals, and a number $(S_i)$ of the time intervals in a reference period from $[i-(Q-1)]^{th}$ to $i^{th}$ ones of the N time intervals, where $1 \leq i \leq N$ and $2 \leq Q \leq i$, wherein a corresponding one of the stocks is grouped into said specific one of the groups in the number $(S_i)$ of the time intervals; and in the permutation clustering mode, the clustering data of each of the stocks corresponding to the $i^{th}$ one of the N time intervals includes the corresponding one of the groups in the $i^{th}$ one of the N time intervals, and group permutation pattern consisting of the corresponding ones of the groups that correspond respectively to $[i-(Q-1)]^{th}$ to $i^{th}$ ones of the N time intervals.

\* \* \* \* \*